(12) United States Patent  
Laufenberg et al.

(10) Patent No.: US 10,445,767 B2  
(45) Date of Patent: Oct. 15, 2019

(54) AUTOMATED GENERATION OF PERSONALIZED MAIL

(71) Applicant: Rise Interactive Media & Analytics, LLC, Chicago, IL (US)

(72) Inventors: Brent Laufenberg, Chicago, IL (US); Joy Wilson, Chicago, IL (US); Eric Sherlock, Chicago, IL (US); Josh Friedlander, Chicago, IL (US); Christine Hill, Chicago, IL (US); Jason French, Chicago, IL (US); Peter Hurford, Chicago, IL (US); Jessie Daubner, Chicago, IL (US)

(73) Assignee: Quad/Graphics, Inc., Sussex, WI (US)

( * ) Notice: Subject to any disclaimer, the term of this patent is extended or adjusted under 35 U.S.C. 154(b) by 173 days.

(21) Appl. No.: 15/386,654

(22) Filed: Dec. 21, 2016

(65) Prior Publication Data  
US 2018/0174182 A1    Jun. 21, 2018

(51) Int. Cl.  
*G06Q 30/02* (2012.01)  
*G06N 5/04* (2006.01)  
(Continued)

(52) U.S. Cl.  
CPC ....... *G06Q 30/0244* (2013.01); *G06F 3/1203* (2013.01); *G06F 3/125* (2013.01);  
(Continued)

(58) Field of Classification Search  
CPC ........... G06Q 10/00–50/00; G06F 1/00–21/00; G06N 3/00–20/00  
(Continued)

(56) References Cited

U.S. PATENT DOCUMENTS

| 5,845,302 | A | * | 12/1998 | Cyman, Jr. | ............. | G06T 11/60 715/209 |
| 5,948,061 | A | * | 9/1999 | Merriman | .............. | G06Q 30/02 705/14.53 |

(Continued)

OTHER PUBLICATIONS

Ansari, Asim, and Carl F. Mela. "E-customization." Journal of marketing research 40.2 (2003): 131-145. (Year: 2003).*

(Continued)

*Primary Examiner* — Alan S Miller  
(74) *Attorney, Agent, or Firm* — McDonnell Boehnen Hulbert & Berghoff LLP

(57) ABSTRACT

An embodiment may involve receiving input information related to an offered product or service, two or more layouts of a print advertisement for the offered product or service, demographics of potential buyers of the offered product or service, and online behavior of the potential buyers. The information may be normalized into a predefined schema for a machine-learning-based recommendation engine operated by a computing device. The embodiment may further involve determining respective selections of the two or more layouts for the potential buyers. The machine-learning-based recommendation engine may select a layout for a potential buyer based on the offered product or service, content and organization of the layout, demographics of the potential buyer, and online behavior of the potential buyer. The embodiment may also involve transmitting, to a printing system, one or more output files representing the offered product or service, the layout, and the potential buyer.

20 Claims, 10 Drawing Sheets

(51) Int. Cl.
*G06F 3/12* (2006.01)
*G06N 20/00* (2019.01)

(52) U.S. Cl.
CPC .......... *G06F 3/1206* (2013.01); *G06F 3/1243* (2013.01); *G06F 3/1285* (2013.01); *G06N 5/04* (2013.01); *G06N 20/00* (2019.01); *G06Q 30/0201* (2013.01); *G06F 3/1269* (2013.01)

(58) Field of Classification Search
USPC ................................................ 705/7.11–7.42
See application file for complete search history.

(56) References Cited

U.S. PATENT DOCUMENTS

| | | | | |
|---|---|---|---|---|
| 6,167,382 A * | 12/2000 | Sparks | ................. | G06F 17/211 705/14.73 |
| 6,298,330 B1 * | 10/2001 | Gardenswartz | ........ | G06Q 30/02 705/14.25 |
| 6,718,551 B1 * | 4/2004 | Swix | ...................... | G06Q 30/02 348/E7.075 |
| 6,847,969 B1 * | 1/2005 | Mathai | ................... | G06Q 30/02 |
| 6,904,408 B1 * | 6/2005 | McCarthy | ............ | A61B 5/6815 705/2 |
| 7,236,258 B2 * | 6/2007 | Wen | ..................... | G06Q 10/107 355/40 |
| 7,315,983 B2 * | 1/2008 | Evans | .................. | G06F 17/243 345/2.1 |
| 7,330,828 B2 * | 2/2008 | Schoder | ................. | G06Q 30/02 705/26.8 |
| 7,729,940 B2 * | 6/2010 | Harvey | .............. | G06Q 10/0639 705/7.31 |
| 8,237,978 B2 * | 8/2012 | Bottcher | ................ | G06Q 10/00 358/1.15 |
| 9,471,928 B2 * | 10/2016 | Fanelli | ................... | G06Q 30/02 |
| 2002/0040374 A1 * | 4/2002 | Kent | ..................... | G06Q 30/02 715/210 |
| 2002/0063897 A1 * | 5/2002 | Matsumoto | ........ | H04N 1/00127 358/1.18 |
| 2005/0021404 A1 * | 1/2005 | Schoder | ................. | G06Q 30/02 705/14.66 |
| 2014/0279050 A1 * | 9/2014 | Makar | ................ | G06Q 30/0269 705/14.66 |

OTHER PUBLICATIONS

The International Search Report and Written Opinion dated Mar. 26, 2018 for International Application No. PCT/US2017/067351, 7 pages.

* cited by examiner

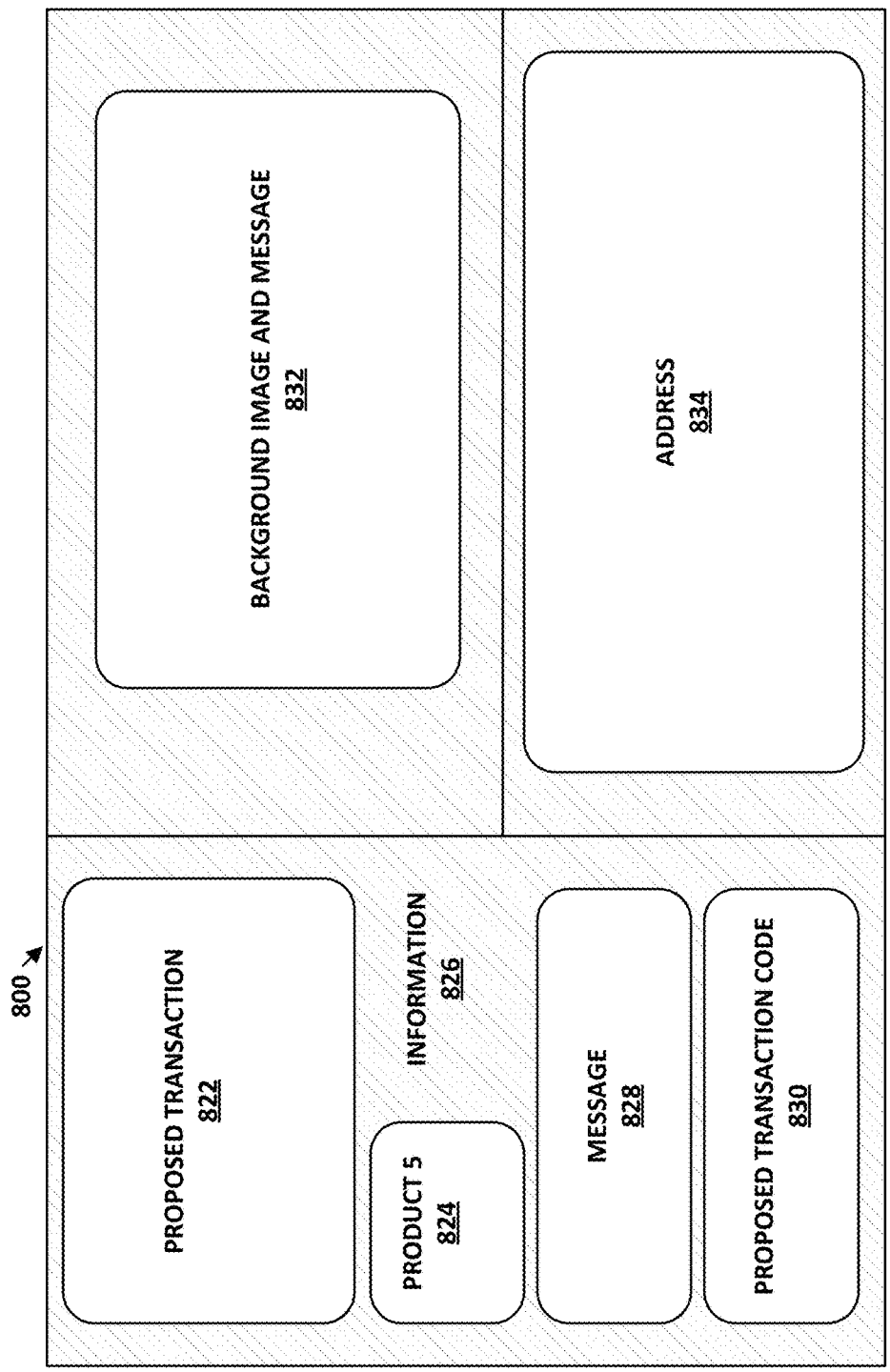

AUTOMATED GENERATION OF PERSONALIZED MAIL

BACKGROUND

Direct mail consists of sending printed advertisements with associated offers to potential buyers in order to increase sales for particular products. The parties involved may include an advertiser, who provides proposed transactions for specified products and services, an advertising service that compiles that data and develops advertisement (ad) copy containing the proposed transactions, a printing system that receives and prints the ads, and a potential buyer who receives the print ads at a residence or place of business.

Traditional direct mail systems are effective when an advertiser knows that a particular buyer has used direct mail to purchase products in the past. Nevertheless, traditional direct mail systems lack other information regarding potential buyers to reach these potential buyers more effectively.

SUMMARY

The embodiments herein involve, but are not limited to, ways in which direct mail advertisements can be personalized so that an advertiser can increase the effectiveness of direct mail advertising campaigns. In particular, the computer implementations described hereafter may involve receiving information from an advertiser, normalizing the information, determining a recommendation based on the information, and transmitting the recommendation to a printing system.

For instance, an advertiser may want to begin a personalized direct mail campaign for sporting goods. The advertiser may send information to an advertising service. This information may include an offered product or service, potential buyers, a proposed transaction, and/or a message, among other possibilities. The advertising service may process this information and, using a machine-based-learning recommendation engine, determine a recommendation encompassing a particular product or service, proposed transaction, and message for each potential buyer. The advertising service may then send a representation of the recommendation to a printing service for inclusion in printed direct mail advertisements, mailed to the potential buyers. The embodiments described herein help advertisers increase the effectiveness of direct mail advertisements through personalization.

A first example embodiment may involve receiving input information related to an offered product or service, two or more layouts of a print advertisement for the offered product or service, demographics of potential buyers of the offered product or service, and online behavior of the potential buyers. This information may be normalized into a pre-defined schema for a machine-learning-based recommendation engine operated by a computing device. The first example embodiment may further involve determining, by the machine-learning-based recommendation engine, respective selections of the two or more layouts for the potential buyers. The machine-learning-based recommendation engine may select a particular layout for a particular potential buyer based on the offered product or service, content and organization of the particular layout, demographics of the particular potential buyer, and online behavior of the particular potential buyer.

The first example embodiment may also involve transmitting, to a printing system, one or more output files representing the offered product or service, the particular layout, and the particular potential buyer. The reception of the one or more output files by the printing system may cause the printing system to print a mailable advertisement conforming to the particular layout, and the mailable advertisement may include a representation of the offered product or service.

In a second example embodiment, an article of manufacture may include a non-transitory computer-readable medium, having stored thereon program instructions that, upon execution by a computing device, cause the computing device to perform operations in accordance with the first example embodiment.

In a third example embodiment, a computing device may include at least one processor, as well as data storage and program instructions. The program instructions may be stored in the data storage, and upon execution by the at least one processor, cause the computing device to perform operations in accordance with the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8B depicts a back side of the personalized direct mail ad of FIG. 8A, according to an example embodiment.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

1. Overview

Figure 1:
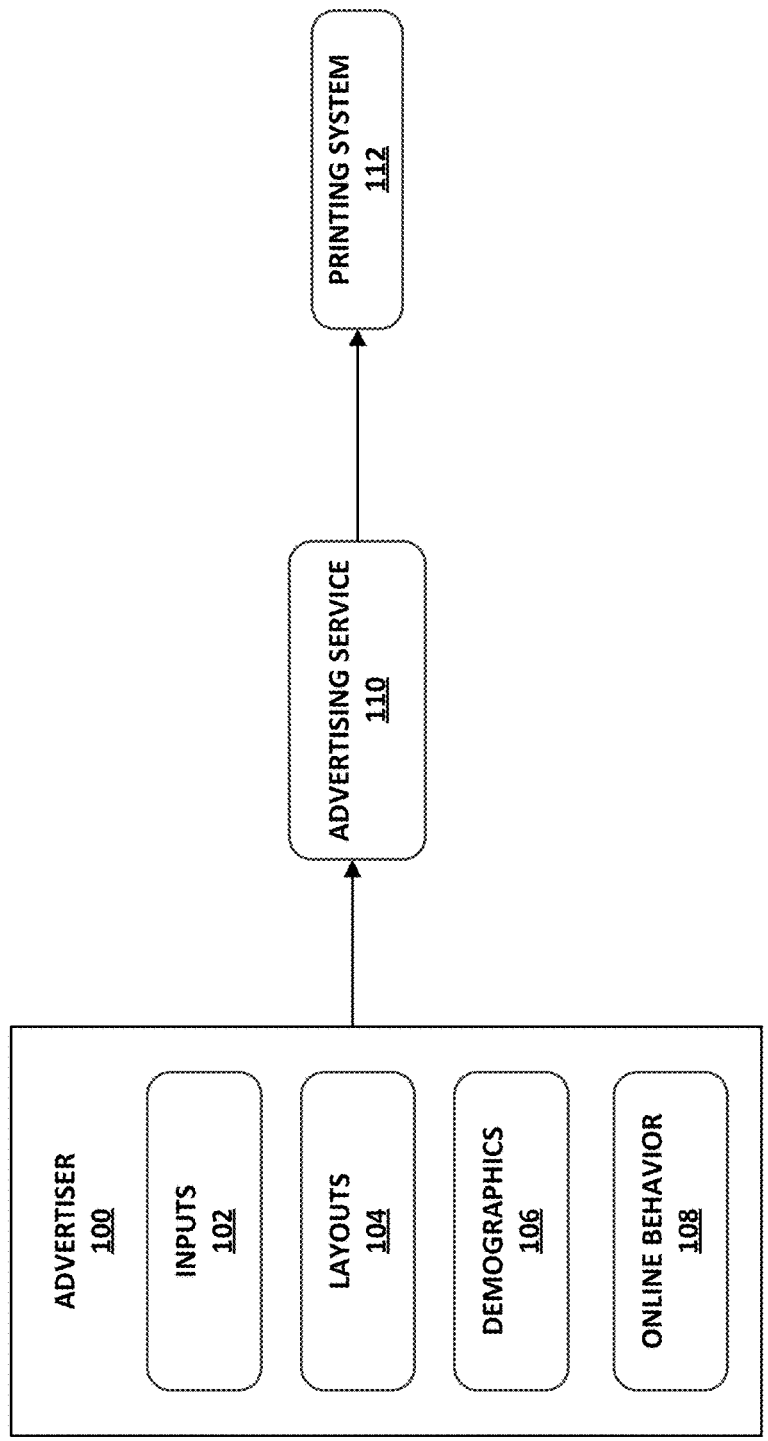
FIG. 1 is a high-level flow chart of a personalized direct mail system, according to an example embodiment.

As noted above, personalized direct mail may facilitate the sending of targeted ads to potential buyers. FIG. 1 depicts a high-level flow chart of a personalized direct mail system, according to an example embodiment. An advertiser 100 (or client) may desire to increase the effectiveness of a direct mail advertising campaign. For example, it is possible the advertiser 100's current direct mail campaigns have a low success rate (this may be called a "conversion rate"). This low conversion rate may be due to the use of a single ad sent to all potential buyers. The advertiser 100 may want to send different ads to different demographics. However, the advertiser 100 may encounter the problem of selecting ads that might be compelling for each potential buyer.

In some cases, the advertiser 100 may hire an advertising service 110 to create the ad and/or choose the potential buyers. This way, the advertiser 100 does not have to create the ad and select the most appropriate ad for each potential buyer. Also, the advertising service 110 may have additional information on potential buyers. The advertiser 100 may send the advertising service 110 information, such as inputs 102, layouts 104, demographics 106, and online behavior 108.

Inputs 102 may include offered products or services, proposed transactions for those products or services, or data relating to particular buyers' transaction histories. In one example, an advertiser may want to start a direct mail advertising campaign to sell sporting goods. In this case, inputs 102 may include various products, such as baseball cleats, soccer balls, or golf clubs, various proposed transactions, such as 20% off all sporting goods or free shipping on all orders, and various transaction histories, such as whether a particular buyer has purchased sporting goods in the past and what sporting goods were purchased at what price. In another example, the advertiser may want to start a direct mail advertising campaign to advertise his painting service. In this case, inputs 102 may include various painting jobs, such as house painting, paint removal, and interior detailing, various proposed transactions such as 10% off with a referral or 15% off if requesting two or more jobs. Other examples may exist.

Layouts 104 may include two or more layouts or templates of a print advertisement relating to inputs 102. For example, the advertiser may want to start a direct mail campaign for designer clothes. In this case, the advertiser 100 may provide the advertising service 110 with two layouts: a layout for women and a layout for men. Layouts 104 may have different designs based on what the advertiser believes will be more attractive to members of each gender.

Demographics 106 may include age, gender, and/or geographic location of potential buyers. For example, a potential buyer may be middle-aged, male, and live in the Midwest. In another example, a potential buyer may be an adolescent, female, and live in the Southeast. These demographics 106 may be particularly useful to the advertising service 110 by helping the advertising service 110 generate recommendations for offered products or services based on age, gender, and/or regional preferences.

Online behavior 108 may include information relating to a potential buyer's actions taken when presented with the advertiser's online ads. For example, an advertiser may be conducting an online advertising campaign. Online behavior 108 may relate to what actions potential buyers take when faced with an ad while browsing the Internet. In this case, online behavior 108 may be a selection action, such as a potential buyer clicking on an ad that was displayed to them. In another example, online behavior 108 may be an action such as clicking on a web page for a product multiple times before purchasing that product. Other examples and actions exist.

The advertising service 110 may receive this information from the advertiser 100, or the advertising service 110 may already have access to this information. For instance, if the advertising service 110 is already conducting an online advertising campaign for the advertiser 100, the advertising service 110 may have access to particular potential buyers' online behavior 108.

The advertising service 110 may normalize the information into a preferred data model. This may include receiving the advertiser 100's data in the advertiser 100's preferred format and converting or mapping that data to the advertising service 110's preferred format. The advertising service 110 may then apply machine learning algorithms to select particular advertisements for buyers. The machine learning algorithms may include content clustering, generalized additive models, gradient boosting machine, regression, alternating least squares, and/or k-means clustering. Other algorithms and methods are possible.

The advertising service 110 may use a specific format for sending the selected ads to the printing system 112. This format may include a series of files, which include information about the personalized ads for particular buyers. The printing system 112 may receive these files and populate the direct mail ads based on these files.

The printing system 112 may send the advertising service response files after transmission of the advertising service's files or on a set schedule, such as daily, weekly, or monthly. After populating the ad, the printing system 112 may print the ad for mailing to the potential buyer. For example, the printing system 112 may add a potential buyer's address, a message to the potential buyer, information about offered products and services, a proposed transaction for the potential buyer, and postage on the ad. The ad may have an embedded machine-readable code for use at a retail store.

The potential buyer may receive the ad via postal mail service. After receiving the ad, the buyer may decide that the products and proposed transactions are interesting and travel to an associated store. The buyer may purchase a product that was featured in the personalized direct mail ad. If the buyer brings the personalized ad, the retail store may scan the machine-readable code on the ad. The retail store may send this transaction information back to the advertiser 100 in order to be incorporated into future information that is transferred from the advertiser 100 to the advertising service 110. That is, the information transfer between advertiser 100, advertising service 110, and printing system 112 can be described as a loop, further refining the ads that the advertising service 110 presents to the buyer.

For example, if a potential buyer is presented with an ad for shoes and purchases the advertised shoes, then the advertiser 100 learns that it is more likely to convert that particular potential buyer with shoe ads in the future. Conversely, if the potential buyer does not make a purchase after receiving the ad, then the advertiser 100 may presume that particular potential buyer is less likely to respond to shoe ads in the future.

However, this information might not indicate that the particular potential buyer is entirely disinterested in the ad. In this case, the advertiser 100 may want to send the particular potential buyer a different proposed transaction, such as 20% off a particular pair of shoes. If presenting the particular potential buyer with a proposed transaction of 20% off still does not result in a conversion, the advertiser 100 knows the particular potential buyer is much less likely to purchase the advertised shoes. With this information, the advertiser 100 can either target different buyers with the same ads, or change the ads that are being sent to the buyers that did not make purchases.

Regardless of how they may be implemented, the embodiments herein may make use of one or more computing devices. These computing devices may include, for example, client devices under the control of users, and server devices that directly or indirectly interact with the client devices. Such devices are described in the following section.

2. Example Computing Devices and Cloud-Based Computing Environments

Figure 2:
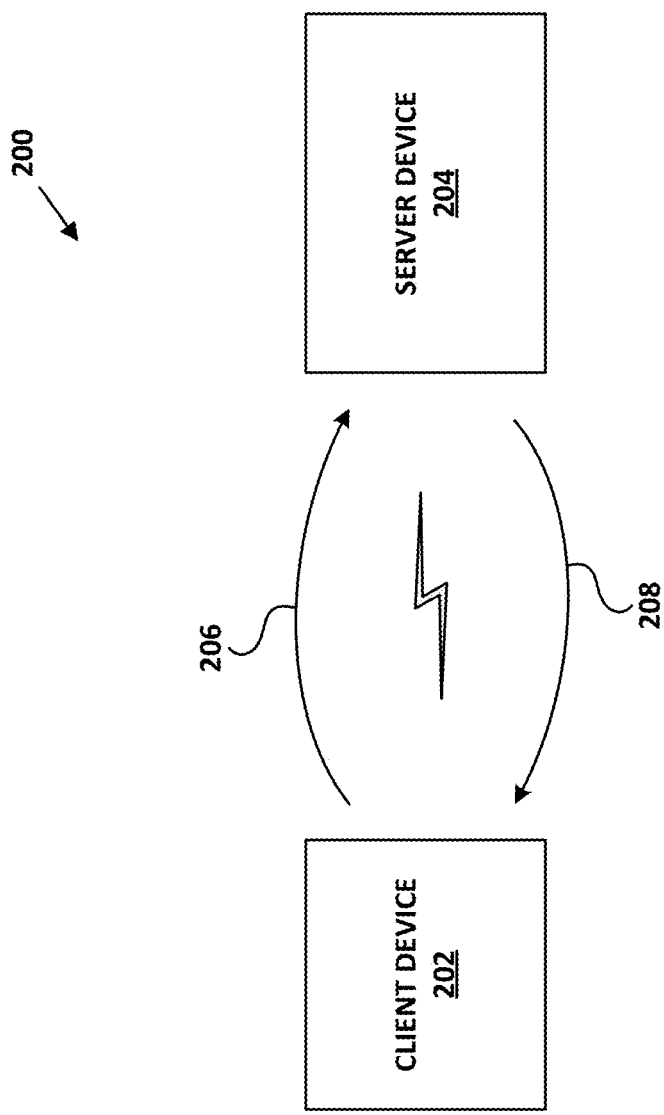
FIG. 2 is a high-level depiction of a client-server computing system, according to an example embodiment.

FIG. 2 illustrates an example communication system 200 for carrying out one or more of the embodiments described herein. Communication system 200 may include computing devices. Herein, a "computing device" may refer to either a client device, a server device (e.g., a stand-alone server computer or networked cluster of server equipment), or some other type of computational platform.

Client device 202 may be any type of device including a personal computer, laptop computer, a wearable computing device, a wireless computing device, a head-mountable computing device, a mobile telephone, or tablet computing device, etc., that is configured to transmit data 206 to and/or receive data 208 from a server device 204 in accordance with the embodiments described herein. For example, in FIG. 2, client device 202 may communicate with server device 204 via one or more wireline or wireless interfaces. In some cases, client device 202 and server device 204 may communicate with one another via a local-area network. Alternatively, client device 202 and server device 204 may each reside within a different network, and may communicate via a wide-area network, such as the Internet.

Client device 202 may include a user interface, a communication interface, a main processor, and data storage (e.g., memory). The data storage may contain instructions executable by the main processor for carrying out one or more operations relating to the data sent to, or received from, server device 204. The user interface of client device 202 may include buttons, a touchscreen, a microphone, and/or any other elements for receiving inputs, as well as a speaker, one or more displays, and/or any other elements for communicating outputs.

Server device 204 may be any entity or computing device arranged to carry out the server operations described herein. Further, server device 204 may be configured to send data 208 to and/or receive data 206 from the client device 202.

Data 206 and data 208 may take various forms. For example, data 206 and data 208 may represent packets transmitted by client device 202 or server device 204, respectively, as part of one or more communication sessions. Such a communication session may include packets transmitted on a signaling plane (e.g., session setup, management, and teardown messages), and/or packets transmitted on a media plane (e.g., text, graphics, audio, and/or video data).

Regardless of the exact architecture, the operations of client device 202, server device 204, as well as any other operation associated with the architecture of FIG. 2, can be carried out by one or more computing devices. These computing devices may be organized in a standalone fashion, in cloud-based (networked) computing environments, or in other arrangements.

Figure 3:
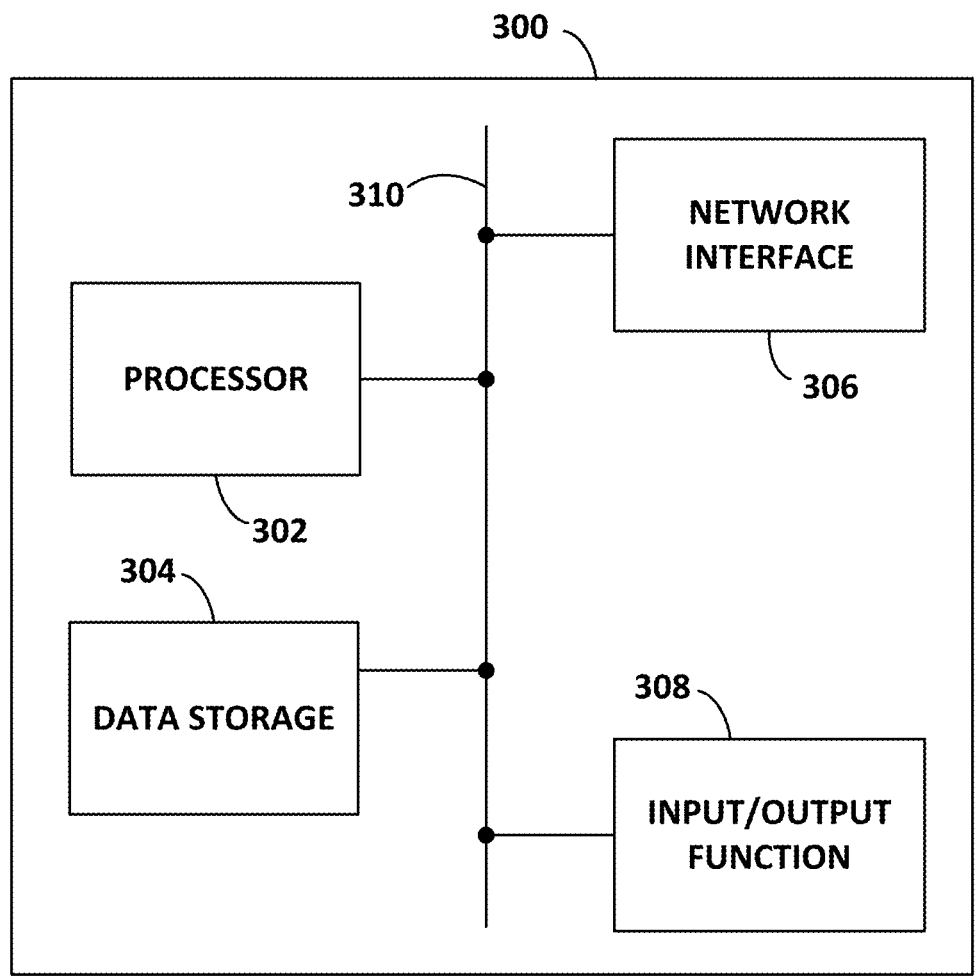
FIG. 3 illustrates a schematic drawing of a computing device, according to an example embodiment.

FIG. 3 is a simplified block diagram exemplifying a computing device 300, illustrating some of the components that could be included in a computing device arranged to operate in accordance with the embodiments herein. Example computing device 300 could be a client device, a server device, or some other type of computational platform. For purpose of simplicity, this specification may equate computing device 300 to a server device from time to time. Nonetheless, the description of computing device 300 could apply to any component used for the purposes described herein.

In this example, computing device 300 includes a processor 302, a data storage 304, a network interface 306, and an input/output function 308, all of which may be coupled by a system bus 310 or a similar mechanism. Processor 302 can include one or more CPUs, such as one or more general purpose processors and/or one or more dedicated processors (e.g., application specific integrated circuits (ASICs), digital signal processors (DSPs), network processors, etc.).

Data storage 304, in turn, may comprise volatile and/or non-volatile data storage and can be integrated in whole or in part with processor 302. Data storage 304 can hold program instructions, executable by processor 302, and data that may be manipulated by these instructions to carry out the various methods, processes, or operations described herein. Alternatively, these methods, processes, or operations can be defined by hardware, firmware, and/or any combination of hardware, firmware and software. By way of example, the data in data storage 304 may contain program instructions, perhaps stored on a non-transitory, computer-readable medium, executable by processor 302 to carry out any of the methods, processes, or operations disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical interfaces.

Input/output function 308 may facilitate user interaction with example computing device 300. Input/output function 308 may comprise multiple types of input devices, such as a keyboard, a mouse, a touch screen, and so on. Similarly, input/output function 308 may comprise multiple types of output devices, such as a screen, monitor, printer, or one or more light emitting diodes (LEDs). Additionally or alternatively, example computing device 300 may support remote access from another device, via network interface 306 or via another interface (not shown), such as a universal serial bus (USB) or high-definition multimedia interface (HDMI) port.

In some embodiments, one or more computing devices may be deployed in a networked architecture. The exact physical location, connectivity, and configuration of the computing devices may be unknown and/or unimportant to client devices. Accordingly, the computing devices may be referred to as "cloud-based" devices that may be housed at various remote locations.

Figure 4:
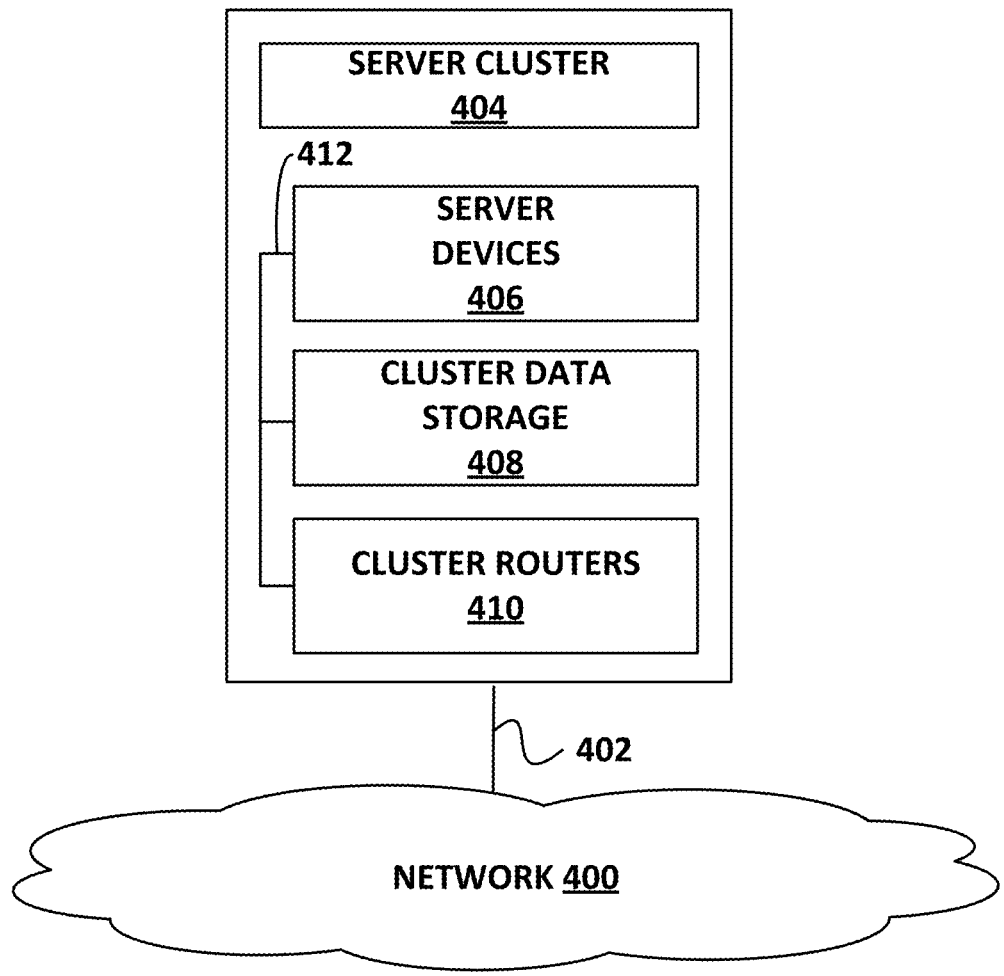
FIG. 4 illustrates a schematic drawing of a networked server cluster, according to an example embodiment.

FIG. 4 depicts a cloud-based server cluster 404 in accordance with an example embodiment. In FIG. 4, functions of a server device, such as server device 204 (as exemplified by computing device 300) may be distributed between server devices 406, cluster data storage 408, and cluster routers 410, all of which may be connected by local cluster network 412. The number of server devices, cluster data storages, and cluster routers in server cluster 404 may depend on the computing task(s) and/or applications assigned to server cluster 404.

For example, server devices 406 can be configured to perform various computing tasks of computing device 300. Thus, computing tasks can be distributed among one or more of server devices 406. To the extent that these computing tasks can be performed in parallel, such a distribution of tasks may reduce the total time to complete these tasks and return a result. For purpose of simplicity, both server cluster 404 and individual server devices 406 may be referred to as "a server device." This nomenclature should be understood to imply that one or more distinct server devices, data storage devices, and cluster routers may be involved in server device operations.

Cluster data storage 408 may be data storage arrays that include disk array controllers configured to manage read and write access to groups of hard disk drives. The disk array controllers, alone or in conjunction with server devices 406, may also be configured to manage backup or redundant copies of the data stored in cluster data storage 408 to protect against disk drive failures or other types of failures that prevent one or more of server devices 406 from accessing units of cluster data storage 408.

Cluster routers 410 may include networking equipment configured to provide internal and external communications for the server clusters. For example, cluster routers 410 may include one or more packet-switching and/or routing devices configured to provide (i) network communications between server devices 406 and cluster data storage 408 via cluster network 412, and/or (ii) network communications between the server cluster 404 and other devices via communication link 402 to network 400.

Additionally, the configuration of cluster routers 410 can be based at least in part on the data communication requirements of server devices 406 and cluster data storage 408, the latency and throughput of the local cluster networks 412, the latency, throughput, and cost of communication link 402, and/or other factors that may contribute to the cost, speed, fault-tolerance, resiliency, efficiency and/or other design goals of the system architecture.

As a possible example, cluster data storage 408 may include any form of database, such as a structured query language (SQL) database. Various types of data structures may store the information in such a database, including but not limited to tables, arrays, lists, trees, and tuples. Furthermore, any databases in cluster data storage 408 may be monolithic or distributed across multiple physical devices.

Server devices 406 may be configured to transmit data to and receive data from cluster data storage 408. This transmission and retrieval may take the form of SQL queries or other types of database queries, and the output of such queries, respectively. Additional text, images, video, and/or audio may be included as well. Furthermore, server devices 406 may organize the received data into web page representations. Such a representation may take the form of a markup language, such as the hypertext markup language (HTML), the extensible markup language (XML), or some other standardized or proprietary format. Moreover, server devices 406 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

3. Example Architecture

A. Input Information

Figure 5:
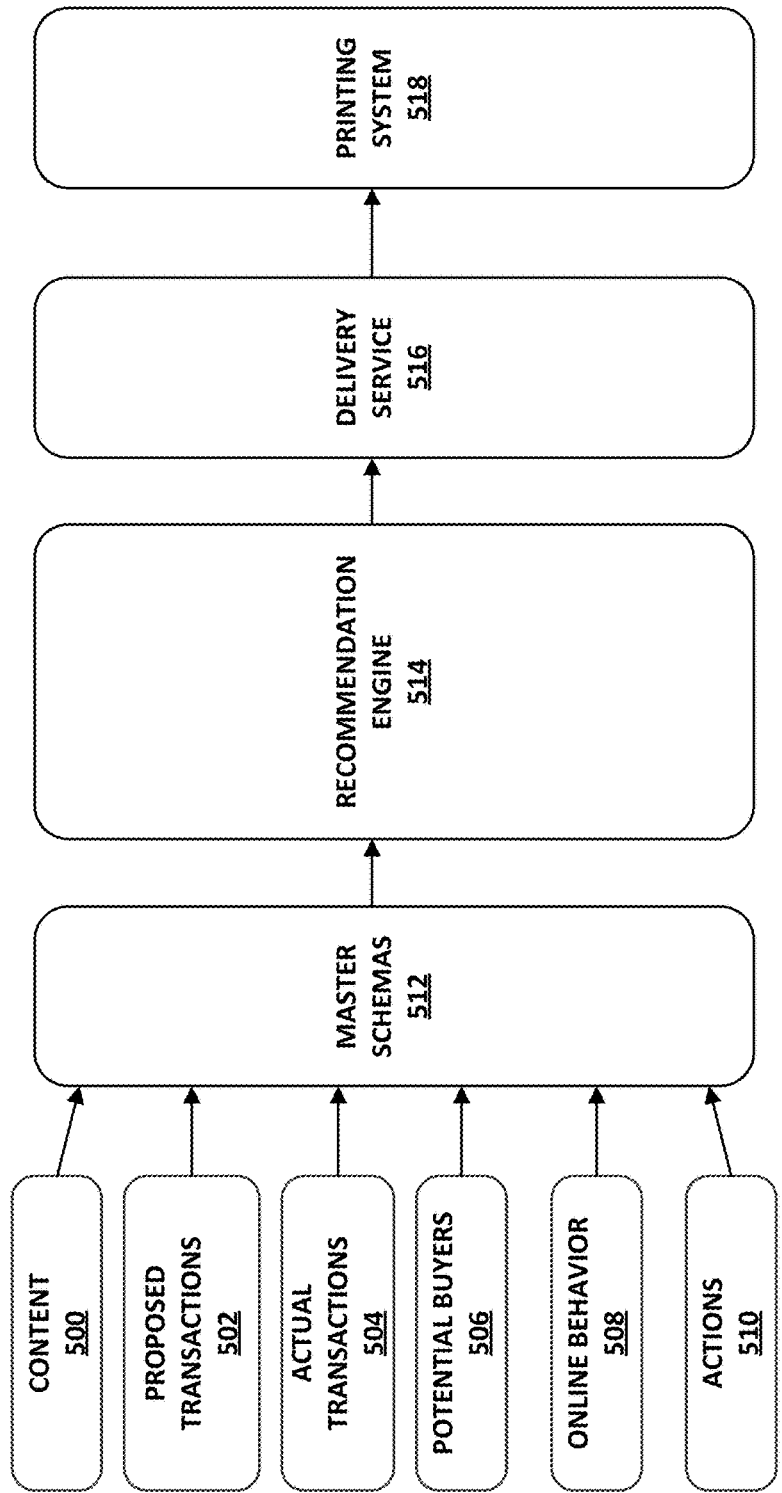
FIG. 5 depicts a personalized direct mail system, according to an example embodiment.

FIG. 5 illustrates information flow for a personalized direct mail system, according to an example embodiment. The flow of information starts with an advertiser sending information to an advertising service. The advertiser may send information including content 500, proposed transactions 502, actual transactions 504, potential buyers 506, online behavior 508, and actions 510 to the advertising service. Alternatively, the advertising service may gather and hold some of this information. For instance, the advertising service may gather actual transactions 504, online behavior 508, and actions 510. The advertising service may receive this information from the advertiser into its master schemas 512, process the information through a recommendation engine 514, and then transmit the information to a printing service through a delivery service 516. The delivery service may send a plurality of files to the printing system 518.

Content 500 may include the advertiser's offered products or services. In one example, an advertiser may be selling sporting equipment. In this example, content 500 may include a baseball bat, golf clubs, or soccer cleats. In another example, an advertiser may be selling cleaning services. In this case, content 500 may include house cleaning, carpet steam cleaning, or laundry services. Many examples and offered products or services may exist.

Proposed transactions 502 may include discounts or special offers the advertiser is willing to offer potential buyers. An example of proposed transactions 502 may include a 20% off coupon or free shipping on particular purchases. Another example of proposed transactions 502 may include a $50 referral bonus for referring another potential buyer, or a 10% off coupon if a potential buyer purchases more than one offered product or service. Other examples of proposed transactions 502 may exist, and may be simple or complex.

Actual transactions 504 may include the transaction histories of potential buyers. For example, actual transactions 504 may include previous purchases the potential buyers have made from the advertiser, or items the buyers have added to a wish-list on the advertiser's website. Actual transactions 504 may also include previous purchases from entities other than the advertiser, items in an online shopping cart, phone calls ordering or inquiring about offered products or services, or in store activity. In one example, a potential buyer may have purchased a baseball glove from an advertiser. In this example, the advertiser would have a record of this transaction through a point-of-sale, online, or equivalent system. The advertiser may then send this transaction as part of actual transactions 504 to the advertising service. Actual transactions 504 are particular useful because they identify offered products or services a particular potential buyer has purchased in the past, indicating a likelihood of the particular potential buyer purchasing them again in the future. Other examples of actual transactions 504 may exist.

Potential buyers 506 may include a list of potential buyers in the advertiser's database. For example, potential buyers 506 may include individuals, groups, or organizations that have previously made purchases from the advertiser, requested information about products from the advertiser, or individuals, groups, or organizations the advertiser believes may be a potential buyer.

Online behavior 508 may include certain metrics relating to a buyer's search history and web traffic. For example, if a potential buyer visits the advertiser's website or related websites, the advertiser may want to target that particular potential buyer. The advertising service may receive the online behavior 508 from the advertiser or from online traffic tracking services, such as Google Analytics or Adobe® Analytics.

Actions 510 may include potential buyers' actions in response to the advertiser's other advertising efforts, such as selecting an ad or rating a product (e.g., 4/5 stars). In one example, the advertiser may be conducting a display advertising campaign. This campaign may display ads on various websites and keep track of how many potential buyers view the ad or click on the ad. This data may be useful to the advertising service in determining whether a particular buyer is interested in certain products. For instance, if the potential buyer has been shown ads relating to baseball bats in the past and not responded, then the advertiser might conclude that the potential buyer is not interested in these products and might not want to send that person further ads for baseball bats.

In another example, the advertiser may be running a paid search advertising campaign. This campaign may display ads on various search engines in return for a fee. If a potential buyer searches for "baseball bat," the advertiser's company may be displayed in one of the "sponsored links" at the top of the search results. The advertiser may track whether the potential buyer clicked on the paid search link after searching for a keyword relating to the advertiser's offered products or services. This information may be useful to the advertising service when determining the potential buyer's interest in specific products or services. The advertising service may receive actions 510 from the advertiser or from its own internal data if the advertising service is conducting those additional advertising campaigns for the advertiser.

The advertiser may provide content 500, proposed transactions 502, actual transactions 504, potential buyers 506, online behavior 508 and actions 510 to the advertising service in a format determined by the advertiser. However, the advertising service may normalize the data into the master schemas 512. This normalization may include converting the information from the advertiser's format to the advertising service's format. The normalization may also include mapping the advertiser's data to the advertising service's database. In one example, the advertiser may provide content 500, proposed transactions 502, actual transactions 504, and potential buyers 506 in the form of a spreadsheet. The advertising service may normalize the information by converting the spreadsheet into a preferred format in the master schemas 512. In another example, the advertiser may provide content 500, proposed transactions 502, actual transactions 504, and potential buyers 506 in the form of various files or documents. The advertising service may import these files or documents into a spreadsheet in the master schemas 512. Other methods of normalizing the information may exist.

The types of information provided by the advertiser may depend on the advertiser's advertising goals. For example, the advertiser may desire to promote a new product. In that case, the advertiser might provide only content 500, proposed transactions 502, and potential buyers 506, but not actual transactions 504. Specifically, the advertiser might not provide actual transactions 504 because either the product is new and the advertiser does not have actual transactions 504 for potential buyers 506, or the actual transactions 504 for potential buyers 506 are not applicable to the new product.

After content 500, proposed transactions 502, actual transactions 504, potential buyers 506, online behavior 508 and actions 510 are received into the master schemas 512, the recommendation engine 514 may retrieve the information from the master schemas 512. The recommendation engine 514 may then select a machine learning algorithm that is suited for the information retrieved from the master schemas 512.

B. Machine Learning Algorithm Selection

Figure 6:
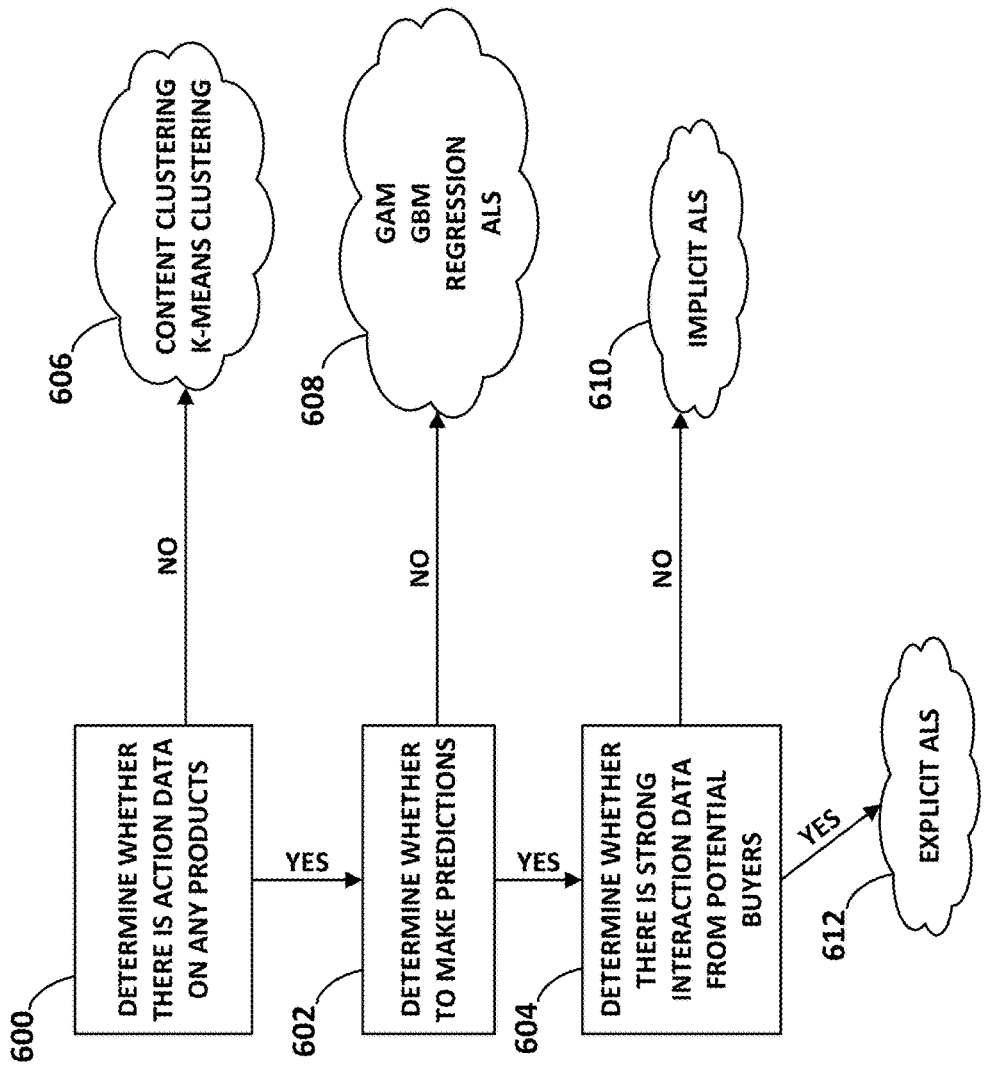
FIG. 6 depicts a flow chart for selecting a machine learning algorithm, according to an example embodiment.

FIG. 6 depicts a flow chart for selecting a machine learning algorithm, according to an example embodiment. The process illustrated by FIG. 6 may be carried out by a computing device, such as computing device 300, and/or a cluster of computing devices, such as server cluster 404. However, the process can be carried out by other types of devices or device subsystems. For example, the process could be carried out by a portable computer, such as a laptop or a tablet device. The process illustrated by FIG. 6 contains blocks 600, 602, and 604, and machine learning recommendations 606, 608, 610, and 612.

Block 600 may involve determining whether there are actions 510 for any of the advertiser's content 500. This step may involve analyzing the data in the master schemas 512 to determine that, for any products in content 500, there is action 510 data present. If action data is present for any products in content 500, the recommendation engine 514 may continue to block 602. However, if action data is not present for any of the products in content 500, the recommendation engine 514 may make a machine learning recommendation 606. An example of when action data might not be present for any products would be for print ads, such as ads in newspapers. In this case, action data might not be present because the advertiser or advertising service might not be able to track whether a potential buyer purchased a product based on the newspaper ad.

Machine learning recommendation 606 may involve the use of the mathematical algorithm of content clustering or k-means clustering. Clustering relates to grouping a set of objects such that objects in the same group are more similar to each other than to those in other groups. Various models of clustering may include connectivity models, centroid models, distribution models, density models, subspace models, group models, and graph-based models. Other models of clustering may exist.

As an illustrative example, the machine learning recommendation 606 may apply k-means clustering. K-means clustering is particularly useful with large datasets, because the algorithm can take a large number of inputs and sort them into manageable clusters. However, the drawbacks of k-means clustering include sensitivity to outliers and noise. K-means clustering involves applying an iterative refinement technique to a data set. The goal of the refinement technique is to search for, and assign, a data point to an appropriate cluster of data points with the nearest mean. For instance, the algorithm may take as inputs demographic data about a potential buyer, such as geographic location, gender, race, age, income, education, whether or not they have children, age of their children, and gender of their children. The output of the algorithm may be clusters or segments of potential buyers that have predictable product preferences. The refinement technique involves two steps, an assignment step and update step.

The assignment step involves assigning each new data point $x_p$ to the cluster set $S_i^{(t)}$ with the nearest mean in a set of k-means $m_1^{(t)} \ldots m_k^{(t)}$. In this equation, t represents time—an iteration of the learning algorithm. To assign a data point, the machine calculates the least within-cluster sum of squares ("WCSS"), illustrated by following equation:

$$S_i^{(t)} = \{x_p : \|x_p - m_i^{(t)}\|^2 \leq \|x_p - m_j^{(t)}\|^2 \forall j, 1 \leq j \leq k\}$$

In this equation, the WCSS of the new data point is the squared Euclidean distance between $x_p$ and the nearest mean. Thus, by applying this equation, the data point $x_p$ is assigned to the cluster set $S_i^{(t)}$.

After assigning a data point to the cluster set with the nearest mean, the updating step is applied. The updating step involves calculating a new mean $m_i^{(t+1)}$ to be the center of the cluster to which $x_p$ was added. The updating step is illustrated by the following equation:

$$m_i^{(t+1)} = \frac{1}{|S_i^{(t)}|} \sum_{x_j \in S_i^{(t)}} x_j$$

The assignment and updating steps are repeated until all of the data points are assigned and the cluster centers are updated. The algorithm has converged when the assignments of data points no longer change. While the recommendation engine 514 may apply k-means clustering, it may apply other algorithms as indicated above.

Block 602 may involve determining whether to make predictions for a particular set of potential buyers. This step may involve analyzing the potential buyers for a direct mail advertising campaign and determining whether these potential buyers are new or previously existing potential buyers, and whether to make predictions for new potential buyers. The predictions may involve determining the likelihood of an ad being effective for one or more of the potential buyers. In one example, an advertiser may desire to start a direct mail campaign to target new potential buyers that do not have any previous relationship with the advertiser. In this example, the recommendation engine 514 may make predictions for the new buyers, since there is no previous transaction data. In another example, an advertiser may desire to start a direct mail campaign to target existing buyers. In such an example, the recommendation engine 514 might not need to make new predictions, because recommendation engine 514 may already have transaction data associated with these potential buyers.

If the recommendation engine 514 determines that new predictions are not to be made, the recommendation engine 514 may continue to block 604. However, if the recommendation engine 514 determines that new predictions are to be made, the recommendation engine may select a machine learning recommendation 608. Machine learning recommendation 608 may involve selecting a machine learning algorithm from a non-inclusive list of: generalized additive models, gradient boosting machine, regression, and alternating least squares ("ALS"). Other machine learning algorithms and methods are available. As an example, the ALS algorithm may take as input a grid of all potential buyers, each product the potential buyer has interacted with, and the strength of that interaction. The algorithm may output predictions about the hypothetical strength of interaction those potential buyers may have with products they have not yet seen. To accomplish this, the algorithm may make inferences based on actions from other potential buyers that have been presented with those products and how the products relate to one another. ALS may be particularly useful when potential buyer data contains many data points on product interaction but little data on customer demographics.

Block 604 may involve determining whether there is strong interaction data from potential buyers. Strong interaction data may include a potential buyer providing a rating of a product (e.g., a potential buyer purchasing a product and then leaving a 5/5 star review with the seller). This step relates to potential buyers' online actions when presented with certain online advertising campaigns, such as paid search or display advertising. The recommendation engine 514 may retrieve information from the master schemas 512 relating to actions 510. If the information in actions 510 contains strong interaction data, the recommendation engine 514 may select a machine learning recommendation 612. However, if the information in actions 510 does not contain strong interaction data, the recommendation engine 514 may select a machine learning recommendation 610.

For example, an advertiser may be conducting a display search advertising campaign. In this case, the advertiser or advertising service may have access to potential buyers' online actions 510 when confronted with particular ads. Online actions 510 may contain potential buyers' product ratings. The advertiser may then decide to start a direct mail advertising campaign. The advertising service may already have access to actions 510 if the advertising service is conducting the display search advertising campaign. In this case, the recommendation engine 514 may determine that there is strong interaction data.

Machine learning recommendation 612 may include the algorithm for explicit ALS. If the advertiser is not conducting a display advertising campaign and does not have actions 510 of potential buyers, then the recommendation engine 514 may select machine learning recommendation 610. Machine learning recommendation 610 may include the algorithm for implicit ALS.

Once recommendation engine 514 selects one of machine learning recommendations 606, 608, 610, or 612, the corresponding algorithm takes the content 500, proposed transactions 502, actual transactions 504, potential buyers 506, online behavior 508, and actions 610 from the master schemas 512 and outputs a plurality of files relating to recommendations for offered products or services to the delivery service 516. The delivery service 516 may transmit the plurality of files to a printing system 518 using a communication system. The communication system may use email, Secure File Transfer Protocol ("SFTP"), or some other mechanism.

C. Recommendation Delivery

Figure 7:
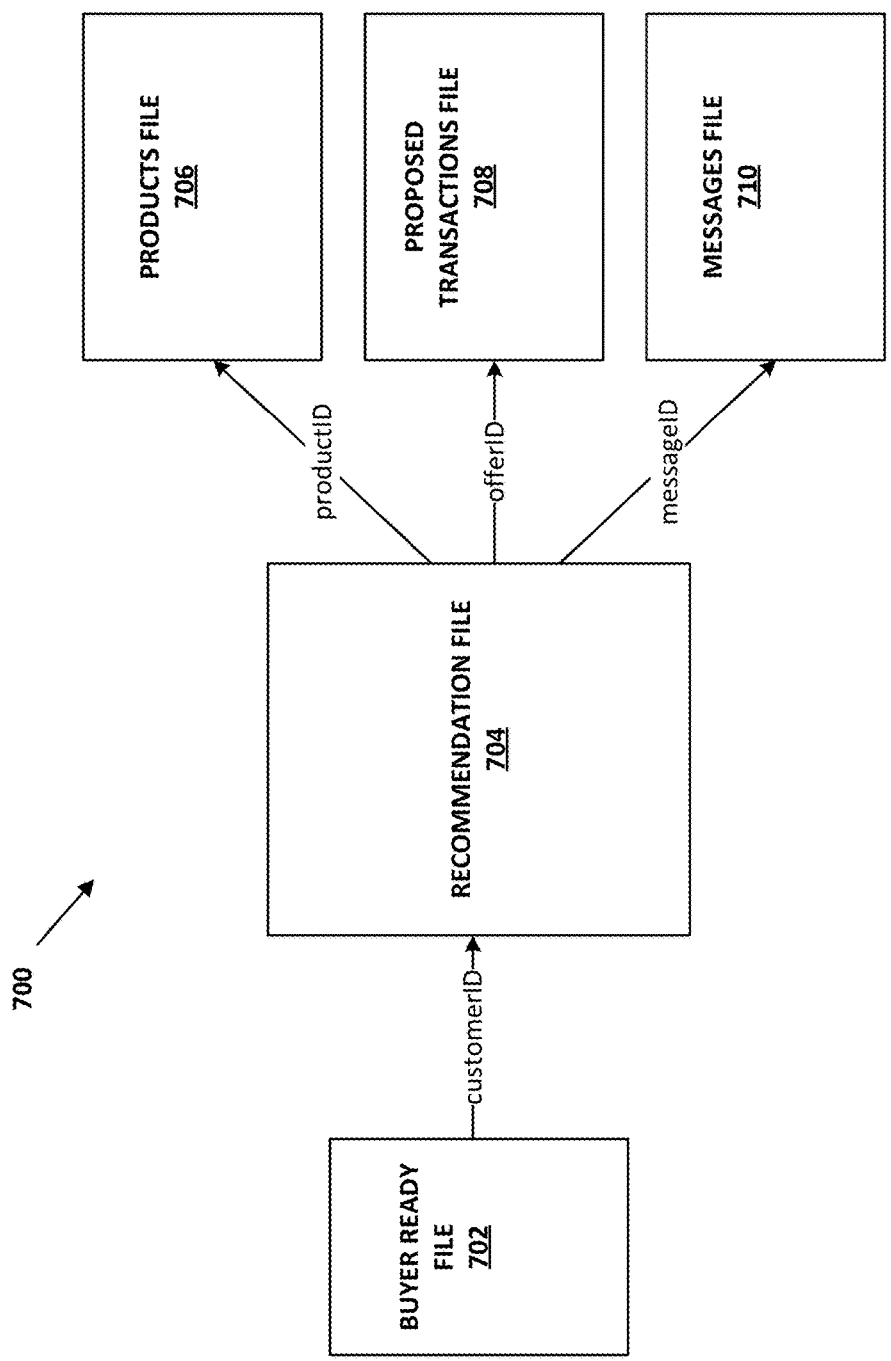
FIG. 7 depicts a data model for communicating to a printing system, according to an example embodiment.

FIG. 7 depicts a data model 700 for the plurality of files. The files may include a buyer ready file 702, recommendation file 704, products file 706, proposed transactions file 708, and messages file 710. The delivery service 516 may populate these files based on content 500 and the output from recommendation engine 514. However, if there is no information sufficient to populate one of these files, the delivery service 516 may generate a blank file instead.

Buyer ready file 702 may contain a list of potential buyers. The buyer ready file 702 may also contain buyer information such as a buyer Id, name, and address. The buyer Id may be a number associated with a particular buyer and corresponds to the buyer Id in the recommendation file 704 described below. The buyer ready file 702 may be in the form of a spreadsheet, text file, XML, HTML, or database entries. Other file formats are possible.

Recommendation file 704 may define a particular direct mail ad configuration for potential buyers by combining the information from the other files received from recommendation engine 514 and outputting them to the printing service 518. The recommendation file 704 may also contain product Ids, Ids for proposed transactions, tracking Ids for proposed transactions, and/or message Ids that are being recommended for each buyer. Product Ids, Ids for proposed transactions, and message Ids may be numbers associated with a particular product, proposed transaction, or message. Tracking Ids for proposed transactions may relate to a particular machine-readable code on the direct mail ad. The machine-readable code may be a barcode, QR code, alphanumeric code, or image based code. Other formats of machine-readable codes are possible. Tracking Ids for proposed transactions may allow an advertiser to determine whether a particular point of sale scanned the machine-readable code associated with the direct mail ad, indicating that the direct mail ad was successful for a particular buyer.

The recommendation file 704 may include any combination of product Ids, proposed transaction Ids, proposed transaction tracking Ids, and/or message Ids. The recommendation file 704 may be represented by a JavaScript Object Novation ("JSON"). As an example, JavaScript code for the recommendation schema is shown below. The lines in this piece of code are numbered for purpose of convenience.

```
1  {
2    "campaign": {
3      "campaignID": Integer.
4      "buyer": {
5        "buyerID": "String".
6        "product": [{ Array.
7          "productId": "String",
8          "proposedTransaction": { Array.
9            "proposedTransactionId": "String",
10           "proposedTransactionTrackingCode":
                 "String"}}],
11       "proposedTransaction": [{ Array.
12         "proposedTransactionId": "String"
13         "proposedTransactionTrackingCode": "String"]},
14       "message": [{ Array.
15         "messageId": "String",
16         "messageTrackingCode": "String"}]}}}
17 }
```

Lines 1 and 17 define a block encompassing the recommendation JSON. Lines 2-5 define the parameters of a recommendation for a direct mail campaign object. A direct mail campaign object may be a particular direct mail advertising campaign that an advertising service is providing for an advertiser. Lines 3 and 4 indicate that the campaign object includes a campaign Id and a buyer object. Lines 5, 6, 11, and 14 specify that the buyer object includes variables for a buyer Id, a product, a proposed transaction, and a message. Lines 7 and 8 specify that the product may have a product Id variable and proposed transaction associated with a particular offered product or service. Lines 9 and 10 specify that the proposed transaction may have a proposed transaction Id and proposed transaction tracking code associated with that proposed transaction.

The proposed transaction at line 11 may be different than the proposed transaction in line 8 that is associated with the product in line 6. The two transaction arrays are different insofar as the proposed transaction array in line 8 may be tied to a specific product, such as 20% off that particular product, while the proposed transaction array in line 11 may be a campaign-wide proposed transaction, such as free shipping that can apply to multiple products. The proposed transaction array in line 11 may have a proposed transaction Id and proposed transaction tracking code associated with that proposed transaction. Further, the buyer object in line 4 may have a message array associated with buyer, as indicated at line 14. The message array in line 14 may have a message Id and message tracking code associated with that message.

Products file 706 may contain a list of the advertiser's offered products or services. For each product, the products file 706 may also contain information such as a product Id, image URLs, as well as other relevant data. The product Id in this file corresponds to the product Id in the recommendation JSON. In one example, products file 706 may contain four products including a baseball bat, golf clubs, soccer cleats, and a hockey stick. In this example, products file 706 may also include images associated with these products. The delivery service 516 might only populate this file if there is a product recommendation.

Proposed transactions file 708 may contain a list of the advertiser's proposed transactions. The proposed transactions file 708 may also contain proposed transaction information such as a proposed transaction Id, proposed transaction amounts, as well as other relevant data. The Id for the proposed transaction in this file corresponds to the proposed transaction Id in the recommendation JSON. The proposed transactions file 708 may be tied to specific products, a particular buyer, or be tied to all buyers and products.

In one example, an advertiser may desire to offer a potential buyer 20% off an in-store purchase. In this example, the advertiser may want to add various proposed transaction descriptions to the ad, such as text including "20% off your entire purchase!" or "scan the barcode on this ad for 15% off!" In another example, the advertiser may desire to offer free shipping on an online order. In this example, the advertiser may want to add proposed transaction descriptions such as text including "Free shipping on your entire order!" or "Use offer code FREESHIP at checkout for free shipping!" Other examples and proposed transaction descriptions may exist. The delivery service 516 might only populate this file if there is a proposed transaction recommendation.

Messages file 710 may contain a list of the advertiser's messages. The message file 710 may also contain message information such as a message Id, ad text, as well as other relevant data. The message Id in this file corresponds to the message Id in the recommendation JSON. In one example, the message file 710 may include ad text such as "Bring this ad to our store at 555 North Clark Street!" In this example, the advertiser may use message file 710 to direct a potential buyer to a preferred location.

In another example, the message file 710 may include ad text such as "Like us on social media for additional offers!" In this example, the advertiser may use the message file 710 to increase its social media presence and drive traffic on its social media pages. Message file 710 may also contain ad text targeting a particular demographic for potential buyers.

For example, message file 710 may contain ad text that states "Be a man, buy our cologne today." This example may be designed to target the specific demographic of middle-aged men. In another example, message file 710 for a designer purse ad may contain ad text stating "Be unique. Stand out in the crowd." This example may be designed to target young females with a strong fashion sense. Any number of examples and messages may exist.

D. Ad Population and Feedback

The printing system 518 may receive the recommendation file 704 containing the recommendation JSON. As described above, the recommendation JSON may contain references to the products, proposed transactions, and messages necessary to generate print ads. The printing system 518 may parse the recommendation file by extracting the various product Ids, Ids for proposed transactions, and message Ids from the recommendation JSON. The printing system 518 may refer to the other files of FIG. 7 to determine at least some of this information. After the printing system 518 has obtained the Ids, it may populate the ads with the text and images that correspond to those Ids. The corresponding text and images may be part of a separate file transfer between the advertising service and printing system 518 or may be encompassed in content 500 sent from the advertiser to the advertising service.

After populating the ads, the printing system 518 may send feedback to the delivery system 516. The printing system 518 may send some feedback before printing has occurred and some feedback after printing has occurred. The feedback may include a plurality of files, including a file receipt report, backfeed file, reject files, or an open jobs file.

The file receipt report may include a high level view of files received, the number of files processed by the printing system 518, and the number of files rejected by the printing system 518 for each recommendation sent by delivery service 516. A file may be rejected if any of the information, such as an Id, is invalid. If a file is rejected, the printing system 518 may attempt to reprocess the file, or skip it, depending on the advertiser's requirements. The advertiser may have a specific threshold for the number of rejected files, which may be determined when the direct mail campaign begins. In that case, the printing system 518 may notify the advertiser when the number of rejected files eclipses the threshold amount. There may be one file receipt report for every recommendation received from the delivery service 516.

The backfeed file may contain a status of each buyer for which machine recommendation engine 514 has generated a recommendation. A particular buyer's status may include whether the direct mail ad for that particular buyer has been processed, printed, or queued to print. This may be useful to track the status of a particular recommendation after being sent to the printing system 518.

The reject files may contain records for each file the printing system 518 has rejected. The printing system 518 may reject a file for not conforming to printing guidelines or not containing the requisite information to generate a direct mail ad. There may be a reject file for each file type described in FIG. 7. For instance, there may be a recommendation reject file, buyer reject file, product reject file, proposed transaction reject file, and message reject file.

The open jobs file may contain a high level report of the printing system 518's print jobs that are still open or not completed. This file may be particularly useful in helping an advertiser keep track of the total amount of direct mail ads that still need to be printed. For example, the advertiser may be engaged in a direct mail ad campaign with 100,000 potential buyers. Printing this number of direct mail ads may take several days. The open jobs file may be helpful to the advertiser because it allows the advertiser to have a high-level view of how many ads have been printed and how many ads are queued to be printed.

E. Ad Layout

Figure 8A:
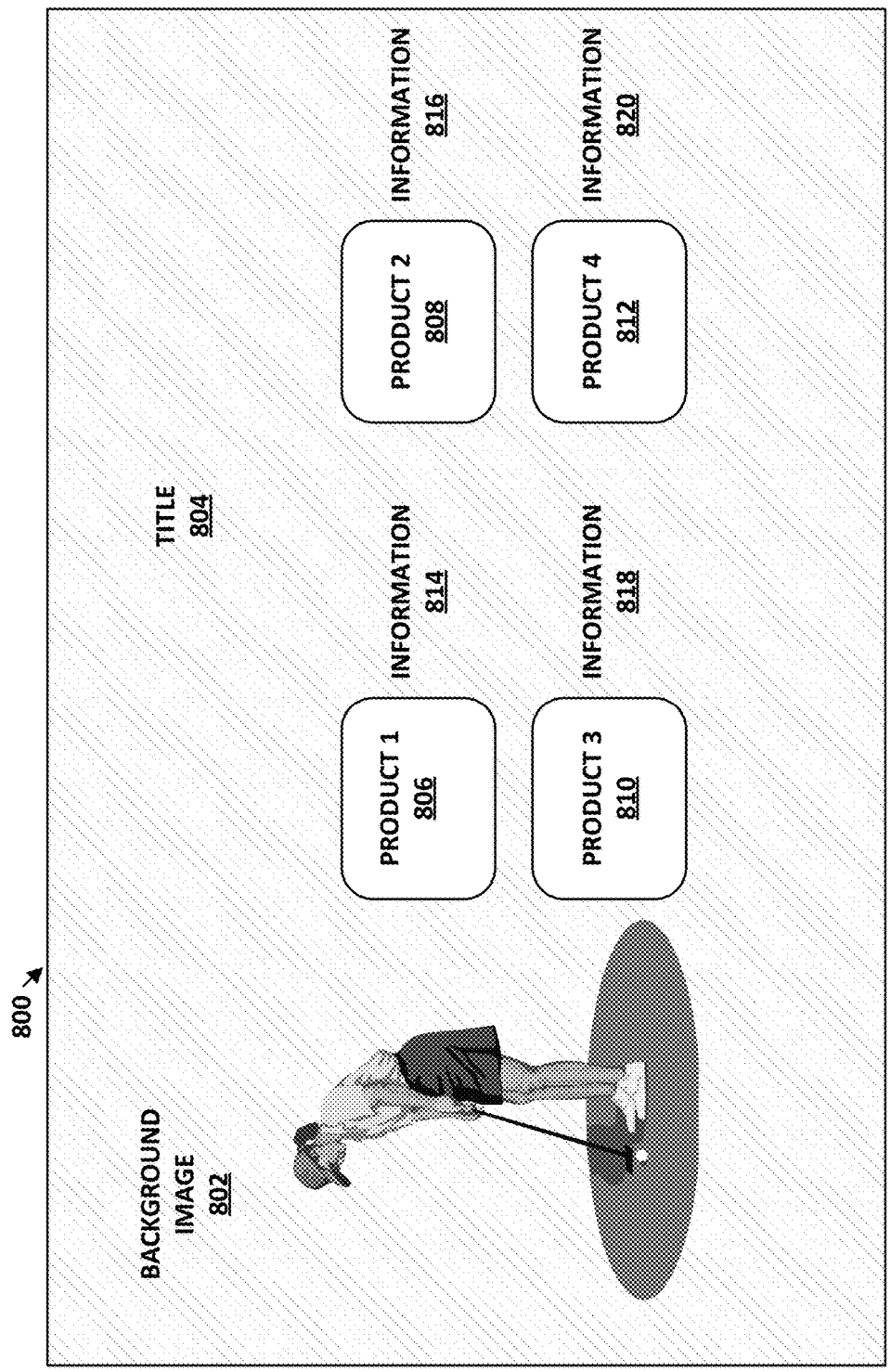
FIG. 8A depicts a front side of a personalized direct mail ad, according to an example embodiment.

FIG. 8A depicts a front side of an example personalized direct mail ad 800. The front side of personalized direct mail ad 800 may contain a background image 802, a title 804, products 806, 808, 810, and 812, and information 814, 816, 818, and 820.

Background image 802 may be an image associated with a particular template. There may be a pre-defined number of background images available for a particular template. These pre-defined images may be provided by the advertiser or advertising service in the products file 706, or in a separate file. In one example, an advertiser may want to advertise golf equipment to a particular potential buyer that is female and a young adult. In this example, the recommendation engine 514 may determine that, out of the selection of pre-defined templates, an image containing a female golfer may be more effective than an image relating to men's baseball or football. Other examples and images may exist.

Title 804 may include a generic phrase tied to a particular template or background image. There may be a pre-defined number of titles associated with each template. These pre-defined titles may be provided by the advertiser or advertising service in the messages file 710, or in a separate file. In the golf equipment example above, the title 804 may state "Get a hole in one this summer!" or "Improve your score!" Other titles and examples may exist.

Products 806, 808, 810, and 812 may be selected by the recommendation engine 514. These products may be related to the background image 802 or title 804. These products may be provided by the recommendation engine 514 in products file 706. In one example, an advertiser may want to advertise women's golf clothing. Specifically, product 806 may be a pair of golf shoes, product 808 may be a hat, product 810 may be a pair of golf khakis, and product 812 may be a golf shirt.

Information 814, 816, 818, and 820 may relate to product information for products 806, 808, 810, and 812, respectively. Information 814, 816, 818, and 820 may relate to a particular product's title, description, price, and if applicable, discounted price. This information may be provided by the recommendation engine 514 in products file 706. In one example, an advertiser may be advertising women's golf accessories that are on sale at a particular store. In this example, product 806 may be a pink golf bag. Thus, information 814 may relate to the pink golf bag. Specifically, information 814 may contain text such as "Pink Golf Cart Bag," "Normal price: $249.99," and "Sale price: $199.99." Any combination of products and corresponding information are possible.

The elements in FIG. 8A may be customizable or non-customizable depending on the advertiser's specific needs and goals. Specifically, the printing system 518 may populate the customizable fields depending on the advertising recommendation from recommendation engine 514. For example, the advertiser may provide the advertising service with two or more layouts relating to golf equipment. The two or more layouts may be part of content 500. The two or more layouts may include a layout for golf clubs, golf clothes, and golf balls. In this example, if the recommendation engine 514 determines that a particular potential buyer would be interested in golf club related products, the recommendation engine 514 may send recommendations relating to golf clubs to the printing system 518. The printing system 518, after receiving the recommendations, may populate the direct mail ad 800 with the golf club layout, which may include a golf club background image 802, a golf club title 804, golf club related products 806, 808, 810, and 812, and golf club product information 814, 816, 818, and 820.

FIG. 8B depicts a reverse side of the personalized direct mail ad 800. This may include a proposed transaction 822, a product 824 with corresponding information 826, a message 828, proposed transaction code 830, background image and message 832, and address 834. These elements may be optional, depending on the advertiser's specific goals; other possible elements and element arrangements may exist.

Proposed transaction 822 may contain proposed transaction descriptions, and may correspond to the proposed transaction recommendation determined by the recommendation engine 514. This proposed transaction 822 may be provided by the recommendation engine 514 in proposed transactions file 708. For example, if the advertiser desires to give all buyers free shipping for a particular offered product or service, proposed transaction 822 might contain ad text stating "Free shipping on your entire order!" In another example, the advertiser may want to give a particular buyer 20% off an entire order with an in-store purchase. In this example, the proposed transaction 822 may contain ad text stating "Bring in this mailer for 20% your entire order!" Other examples and proposed transactions may exist.

Product 824 and corresponding information 826 may be an additional product that was not included on the front side of the direct mail ad 800 in FIG. 8B. This product 824 and information 826 may be provided by the recommendation engine 514 in products file 706. Product 824 and information 826 may also be a special product or service that the advertiser wants to.

Message 828 may contain personalized ad text directed at a particular potential buyer. Message 828 may correspond to the message recommendation determined by the recommendation engine 514. This message 828 may be provided by the recommendation engine 514 in messages file 710. For example, if the advertiser wants to direct a potential buyer to a retail store, message 828 may contain text stating "Bring this coupon to your nearest store." In another example, message 828 may be used to target a particular potential buyer. In this example, message 828 may contain text with the particular potential buyer's name. This message 828 may make the particular potential buyer feel special, increasing the chance of a conversion. Any number of examples and messages exist.

Proposed transaction code 830 may contain a promotional code that a potential buyer could use either online or at a local store. This proposed transaction code 830 may be provided by the recommendation engine 514 in proposed transactions file 708. For example, proposed transaction code 830 may be text containing a code, such as "FREESHIP" that can be used at an online store for free shipping. In another example, the proposed transaction code 830 may be a barcode with accompanying text. In this example, the text could state "Scan this code for 20% off!" with a machine-readable code beneath it. Other examples and proposed transaction codes exist.

Background image and message 832 may contain an image and message relating to the overall direct mail ad campaign or the targeted potential buyer. Background image and message 832 may be provided by the advertiser or advertising service in the products file 706, or in a separate file. For example, background image and message 832 may contain an image and corresponding ad text that may remain the same for all variations of the direct mail ad 800. In this example, if the advertiser wants to sell golf equipment, the background image and message 832 may contain an image of a golfer with accompanying ad text "Follow us on social media to enter our sweepstakes!" In this case, the same background image and message 832 would appear on every variation of the direct mail ad. In another example, background image and message 832 may be customizable and be related to a specific layout.

Address 834 may contain the particular potential buyer's name and address. Aspects of address 834 may be customizable or non-customizable. For instance, a return address portion of address 834 may be non-customizable and contain the advertiser's mailing address. Conversely, the buyer's name and address may be populated by the printing system 518 based on the buyer ready file 702.

The elements in FIG. 8B may be customizable or non-customizable depending on the advertiser's specific needs and goals. Specifically, the printing system 518 may populate the customizable fields depending on the advertising recommendation from recommendation engine 514. For example, the advertiser may provide the advertising service with two or more layouts relating to golf equipment. The two or more layouts may include a layout for golf clubs, golf bags, or golf balls. In this example, if the recommendation engine 514 determines that a particular potential buyer would be interested in golf ball related products, the recommendation engine 514 may send recommendations relating to golf balls to the printing system 518. The printing system 518, after receiving the recommendations, may populate the reverse side of the direct mail ad 800 with the golf ball layout, which may include a golf ball proposed transaction 822, a golf ball product 824 with corresponding information 826, a golf ball message 828, proposed transaction code 830, and background image and message 832. The address 834 may be customizable but not related to the recommendation from recommendation engine 514.

4. Example Operations

Figure 9:
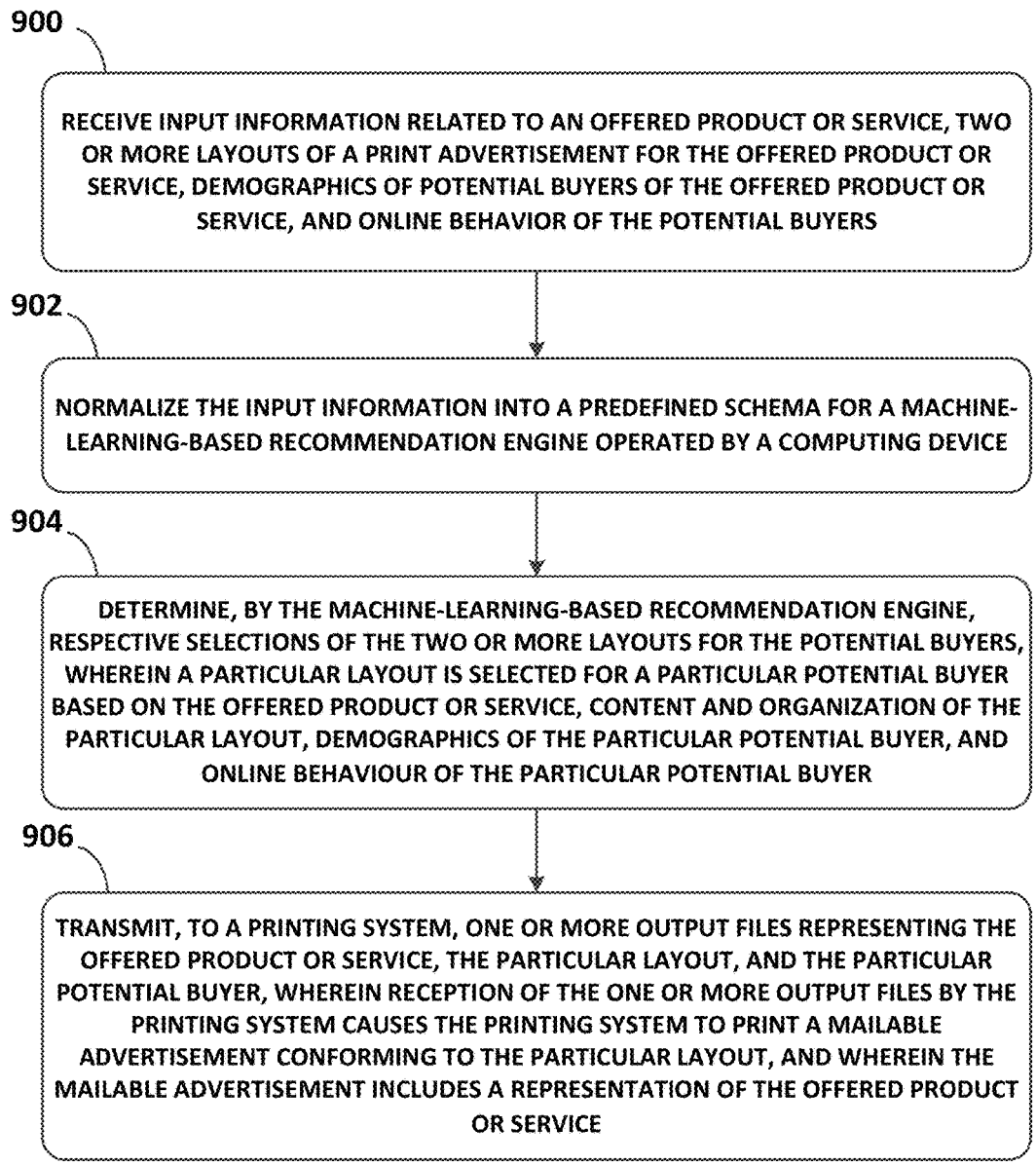
FIG. 9 depicts a flowchart, according to an example embodiment.

FIG. 9 is a flow chart illustrating an example embodiment. The process illustrated by FIG. 9 may be carried out by a computing device, such as computing device 300, and/or a cluster of computing devices, such as server cluster 404. However, the process can be carried out by other types of devices or device subsystems. For example, the process could be carried out by a portable computer, such as a laptop or a tablet device.

Block 900 may involve receiving input information related to an offered product or service, two or more layouts of a print advertisement for the offered product or service, demographics of potential buyers of the offered product or service, and online behavior of the potential buyers.

Block 902 may involve normalizing the input information into a predefined schema for a machine-learning-based recommendation engine operated by a computing device.

Block 904 may involve determining, by the machine-learning-based recommendation engine, respective selections of the two or more layouts for the potential buyers. The machine-learning-based recommendation engine may select a particular layout for a particular potential buyer based on the offered product or service, content and organization of the particular layout, demographics of the particular potential buyer, and online behavior of the particular potential buyer.

Block 906 may involve transmitting, to a printing system, one or more output files representing the offered product or service, the particular layout, and the particular potential buyer. The reception of the one or more output files by the printing system may cause the printing system to print a mailable advertisement conforming to the particular layout, and the mailable advertisement may include a representation of the offered product or service.

In some embodiments, the input information may also include respective historical transactions or orders made by the potential buyers. The particular layout selected for the particular potential buyer may also be based on historical transactions or orders made by the particular potential buyer.

In some embodiments, the input information may also include respective proposed transactions for the potential buyers. The particular layout selected for the particular potential buyer may also be based on a particular proposed transaction for the particular potential buyer. The particular proposed transaction may involve the offered product or service.

In some embodiments, the demographics of the particular potential buyer may include age, gender, and geographic location of the particular potential buyer.

In some embodiments, the one or more output files representing the offered product or service include a buyer mail ready file, recommendation file, and products file. The buyer mail ready file includes a buyer identification number, a name, and a mailing address of the particular potential buyer. The recommendation file includes a recommendation for the offered product or service and the products file includes a product identification number and image associated with the offered product or service.

In some embodiments, the one or more output files further include a proposed transaction file. The recommendation file may further include a recommendation for a particular proposed transaction for the particular potential buyer. The proposed transaction file may include a proposed transaction identification number and amount associated with the particular proposed transaction.

In some embodiments, the one or more output files further include a message file. The recommendation file may further include a recommendation for a particular message for the particular potential buyer. The message file includes a message identification number and advertising text associated with the particular message.

Some embodiments further involve receiving feedback from the printing system relating to the one or more output files. The feedback may include a file receipt report and an open jobs file. The file receipt report may include information relating to a total amount of output files received by the printing system, a status of the output files received by the printing system, and a total amount of output files rejected by the printing system. The open jobs file may include a report of a total number of print jobs that are still pending.

In some embodiments, the determining, by the machine-learning-based recommendation engine, respective selections includes applying one or more machine learning algorithms to the input information as normalized. The machine learning algorithms may use k-means clustering, alternating least squares, or regression.

In some embodiments, the particular layout may include non-customizable and customizable fields. The printing system may populate the customizable fields with a representation of the offered product or service, a particular proposed transaction, or a particular message relating to the offered product or service. The particular message may be based on the demographics of the particular potential buyer.

The embodiments of FIG. 9 may be simplified by the removal of any one or more of the features shown therein. Further, these embodiments may be combined with features, aspects, and/or implementations of any of the previous figures or otherwise described herein.

5. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrently or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
    receiving, by a computing device, input information related to an offered product or service, two or more layouts of a print advertisement for the offered product or service, demographics of potential buyers of the offered product or service, and online behavior of the potential buyers, wherein the online behavior of the potential buyers includes actions taken by the potential buyers when presented with online advertisements;
    normalizing, by the computing device, the input information into a predefined schema for a machine-learning-based recommendation engine operated by the computing device;
    determining, by the machine-learning-based recommendation engine, respective selections of the two or more layouts for the potential buyers, wherein a particular layout is selected for a particular potential buyer based on the offered product or service, content and organization of the particular layout, demographics of the particular potential buyer, and online behavior of the particular potential buyer; and
    transmitting, to a printing system, one or more output files representing the offered product or service, the particular layout, and the particular potential buyer, wherein reception of the one or more output files by the printing system causes the printing system to print a mailable document conforming to the particular layout, and wherein the mailable document includes a representation of the offered product or service.

2. The method of claim 1, wherein the input information also includes respective historical transactions or orders made by the potential buyers, and wherein the particular layout selected for the particular potential buyer is also based on historical transactions or orders made by the particular potential buyer.

3. The method of claim 1, wherein the input information also includes respective proposed transactions for the potential buyers, wherein the particular layout selected for the particular potential buyer is also based on a particular proposed transaction for the particular potential buyer, and wherein the particular proposed transaction involves the offered product or service.

4. The method of claim 1, wherein the demographics of the particular potential buyer comprise age, gender, and geographic location of the particular potential buyer.

5. The method of claim 1, wherein the one or more output files representing the offered product or service comprise a buyer mail ready file, recommendation file, and products file, wherein the buyer mail ready file comprises a buyer identification number, a name, and a mailing address of the particular potential buyer, wherein the recommendation file comprises a recommendation for the offered product or service, and wherein the products file comprises a product identification number and image associated with the offered product or service.

6. The method of claim 5, wherein the one or more output files further comprise a proposed transaction file, wherein the recommendation file further comprises a recommendation for a particular proposed transaction for the particular potential buyer, and wherein the proposed transaction file comprises a proposed transaction identification number and amount associated with the particular proposed transaction.

7. The method of claim 5, wherein the one or more output files further comprise a message file, wherein the recommendation file further comprises a recommendation for a particular message for the particular potential buyer, and wherein the message file comprises a message identification number and advertising text associated with the particular message.

8. The method of claim 1, further comprising:
    receiving feedback from the printing system relating to the one or more output files, wherein the feedback comprises a file receipt report and an open jobs file, wherein the file receipt report comprises information relating to a total amount of output files received by the printing system, a status of the output files received by the printing system, and a total amount of output files rejected by the printing system, and wherein the open jobs file comprises a report of a total number of print jobs that are still pending.

9. The method of claim 1, wherein the determining, by the machine-learning-based recommendation engine, respective selections comprises applying one or more machine learning algorithms to the input information as normalized, wherein the machine learning algorithms use k-means clustering, alternating least squares, or regression.

10. The method of claim 1, wherein the particular layout comprises non-customizable and customizable fields, wherein the printing system populates the customizable fields with a representation of the offered product or service, a particular proposed transaction, or a particular message relating to the offered product or service, and wherein the particular message is based on the demographics of the particular potential buyer.

11. A non-transitory computer-readable medium having stored therein instructions executable by a processor to cause a control device to perform operations comprising:
    receiving input information related to an offered product or service, two or more layouts of a print advertisement for the offered product or service, demographics of potential buyers of the offered product or service, and online behavior of the potential buyers, wherein the online behavior of the potential buyers includes actions taken by the potential buyers when presented with online advertisements;

normalizing the input information into a predefined schema for a machine-learning-based recommendation engine operated by the control device;

determining, by the machine-learning-based recommendation engine, respective selections of the two or more layouts for the potential buyers, wherein a particular layout is selected for a particular potential buyer based on the offered product or service, content and organization of the particular layout, demographics of the particular potential buyer, and online behavior of the particular potential buyer; and transmitting, to a printing system, one or more output files representing the offered product or service, the particular layout, and the particular potential buyer, wherein reception of the one or more output files by the printing system causes the printing system to print a mailable document conforming to the particular layout, and wherein the mailable document includes a representation of the offered product or service.

12. The non-transitory computer-readable medium of claim 11, wherein the input information also includes respective historical transactions or orders made by the potential buyers, and wherein the particular layout selected for the particular potential buyer is also based on historical transactions or orders made by the particular potential buyer.

13. The non-transitory computer-readable medium of claim 11, wherein the input information also includes respective proposed transactions for the potential buyers, wherein the particular layout selected for the particular potential buyer is also based on a particular proposed transaction for the particular potential buyer, and wherein the particular proposed transaction involves the offered product or service.

14. The non-transitory computer-readable medium of claim 11, wherein the demographics of the particular potential buyer comprise age, gender, and geographic location of the particular potential buyer.

15. The non-transitory computer-readable medium of claim 11, wherein the one or more output files representing the offered product or service comprise a buyer mail ready file, recommendation file, and products file, wherein the buyer mail ready file comprises a buyer identification number, a name, and a mailing address of the particular potential buyer, wherein the recommendation file comprises a recommendation for the offered product or service, and wherein the products file comprises a product identification number and image associated with the offered product or service.

16. The non-transitory computer-readable medium of claim 15, wherein the one or more output files further comprise a proposed transaction file, wherein the recommendation file further comprises a recommendation for a particular proposed transaction for the particular potential buyer, and wherein the proposed transaction file comprises a proposed transaction identification number and amount associated with the particular proposed transaction.

17. The non-transitory computer-readable medium of claim 11, wherein the one or more output files further comprise a message file, wherein the recommendation file further comprises a recommendation for a particular message for the particular potential buyer, and wherein the message file comprises a message identification number and advertising text associated with the particular message.

18. The non-transitory computer-readable medium of claim 11, further comprising:

receiving feedback from the printing system relating to the one or more output files, wherein the feedback comprises a file receipt report and an open jobs file, wherein the file receipt report comprises information relating to a total amount of output files received by the printing system, a status of the output files received by the printing system, and a total amount of output files rejected by the printing system, and wherein the open jobs file comprises a report of a total number of print jobs that are still pending.

19. The non-transitory computer-readable medium of claim 11, wherein the determining, by the machine-learning-based recommendation engine, respective selections comprises applying one or more machine learning algorithms to the input information as normalized, wherein the machine learning algorithms use k-means clustering, alternating least squares, or regression.

20. A computing device comprising:

a processor;

memory; and program instructions, stored in the memory, that upon execution by the at least one processor cause the computing device to perform operations comprising:

receiving input information related to an offered product or service, two or more layouts of a print advertisement for the offered product or service, demographics of potential buyers of the offered product or service, and online behavior of the potential buyers, wherein the online behavior of the potential buyers includes actions taken by the potential buyers when presented with online advertisements;

normalizing the input information into a predefined schema for a machine-learning-based recommendation engine operated by the control device;

determining, by the machine-learning-based recommendation engine, respective selections of the two or more layouts for the potential buyers, wherein a particular layout is selected for a particular potential buyer based on the offered product or service, content and organization of the particular layout, demographics of the particular potential buyer, and online behavior of the particular potential buyer; and transmitting, to a printing system, one or more output files representing the offered product or service, the particular layout, and the particular potential buyer, wherein reception of the one or more output files by the printing system causes the printing system to print a mailable document conforming to the particular layout, and wherein the mailable document includes a representation of the offered product or service.

* * * * *